(12) United States Patent
Tunkiel et al.

(10) Patent No.: US 9,896,906 B2
(45) Date of Patent: Feb. 20, 2018

(54) AUTONOMOUS FLOW CONTROL SYSTEM AND METHODOLOGY

(71) Applicant: Schlumberger Technology Corporation, Sugar Land, TX (US)

(72) Inventors: Andrzej Tunkiel, Algard (NO); Terje Moen, Algard (NO); Aleksandar Rudic, Algard (NO); Gocha Chochua, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/839,185

(22) Filed: Aug. 28, 2015

(65) Prior Publication Data

US 2016/0061004 A1 Mar. 3, 2016

Related U.S. Application Data (60) Provisional application No. 62/043,662, filed on Aug. 29, 2014.

(51) Int. Cl.
*E21B 34/08* (2006.01)
*G05D 7/01* (2006.01)
*E21B 43/12* (2006.01)

(52) U.S. Cl.
CPC .............. *E21B 34/08* (2013.01); *E21B 43/12* (2013.01); *G05D 7/0146* (2013.01)

(58) Field of Classification Search
CPC .................................. E21B 34/08; E21B 43/12
See application file for complete search history.

(56) References Cited

U.S. PATENT DOCUMENTS

| | | | | |
|---|---|---|---|---|
| 4,364,232 A | * | 12/1982 | Sheinbaum | E21B 43/121 166/372 |
| 6,082,455 A | * | 7/2000 | Pringle | E21B 43/12 166/168 |
| 7,409,999 B2 | | 8/2008 | Henriksen et al. | |
| 8,708,050 B2 | * | 4/2014 | Dykstra | E21B 43/12 166/250.15 |

(Continued)

FOREIGN PATENT DOCUMENTS

| WO | 2009088292 A1 | 7/2009 |
|---|---|---|
| WO | 2013130096 A1 | 9/2013 |
| WO | 2013139601 A2 | 9/2013 |

OTHER PUBLICATIONS

PCT/US2015/047426, International Search Report and Written Opinion dated Nov. 18, 2015, 14 pgs.

*Primary Examiner* — Matthew R Buck
*Assistant Examiner* — Aaron Lembo (57) ABSTRACT

A technique facilitates regulation of flow through a flow control device to improve a well operation, such as a production operation. The technique utilizes a flow control device which has a valve positioned in a housing for movement between flow positions. The different flow positions allow different levels of flow through a primary flow port. At least one flow regulation element, e.g. a Venturi based flow regulation element, is used in a control line in communication with the valve to establish a differential pressure acting on the valve. The differential pressure is a function of fluid properties and is used to autonomously actuate the flow control device to an improved flow position.

19 Claims, 6 Drawing Sheets

(56) References Cited

U.S. PATENT DOCUMENTS

| | | | |
|---|---|---|---|
| 8,752,629 B2 | 6/2014 | Moen | |
| 8,866,317 B2* | 10/2014 | Ocalan | H02P 9/006 290/1 R |
| 2006/0086498 A1* | 4/2006 | Wetzel | E21B 41/0085 166/250.12 |
| 2009/0000787 A1 | 1/2009 | Hill et al. | |
| 2009/0166045 A1* | 7/2009 | Wetzel | E21B 41/0085 166/381 |
| 2009/0218103 A1 | 9/2009 | Aakre et al. | |
| 2010/0059221 A1* | 3/2010 | Vannuffelen | E21B 41/04 166/264 |
| 2011/0079384 A1 | 4/2011 | Russell et al. | |
| 2011/0198097 A1 | 8/2011 | Moen | |
| 2011/0266001 A1* | 11/2011 | Dykstra | E21B 43/12 166/319 |
| 2015/0060084 A1* | 3/2015 | Moen | E21B 43/12 166/373 |

* cited by examiner

AUTONOMOUS FLOW CONTROL SYSTEM AND METHODOLOGY

CROSS-REFERENCE TO RELATED APPLICATIONS

The present document is based on and claims priority to U.S. Provisional Application Ser. No. 62/043,662, filed Aug. 29, 2014, which is incorporated herein by reference in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components, e.g. sand control systems, may be installed in the well. In certain applications, inflow control devices are employed to create flow restrictions through the production tubing. The fluid flow through the inflow control device moves through a port with a fixed setting which provides a controlled pressure drop. However, reservoirs may produce with an unpredictable performance associated with variations in fluid properties that result from reservoir changes and fluid changes over time.

SUMMARY

In general, a system and methodology are provided for regulating flow through flow control devices to improve a well operation, such as a production operation. The technique utilizes a flow control device which has a valve positioned in a housing for movement between flow positions. The different flow positions allow different levels of flow through a primary flow passage. At least one flow regulation element, e.g. a Venturi based flow regulation element, is used in a control line in communication with the valve to establish a differential pressure acting on the valve. The differential pressure is a function of fluid properties and is used to autonomously actuate the flow control device to an improved flow position.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for facilitating a flow control operation, such as a well production operation or a well injection operation. The system and methodology enable an autonomous regulation of flow through a flow control device or flow control devices during the life of the flow control operation. In well applications, the flow control device(s) may be employed to improve the overall well operation by autonomously regulating flow over time at specific well zones as conditions, e.g. fluid properties, flow rates, and pressures, may change with time.

The technique utilizes a flow control device, e.g. an inflow control device, which has a valve positioned in a housing for movement between flow positions. The different flow positions allow different levels of flow through a primary flow passage. At least one flow regulation element is used in cooperation with the valve to establish a differential pressure acting on the valve. The differential pressure is a function of fluid properties and is used to autonomously actuate the flow control device to an improved flow position. In a well-related production operation, for example, a plurality of the flow control devices may be used as inflow control devices in cooperation with a sand control system. However, the flow control devices may be used without sand control in various types of well systems. In a sand control example, the sand control system may have a plurality of screen assemblies through which well fluid, e.g. oil, flows from a surrounding reservoir, into a wellbore, into the screen assemblies, through the flow control devices, and into a base pipe for production to a surface location or other desired location. However, the flow control devices also may be used for flow injection operations and other well related operations.

Because reservoir related flow performance can change over time or the reservoir may flow in an unexpected manner, the flow control devices described herein enable an autonomous adjustment of the flow rate at individual flow control devices to automatically improve performance of the overall system over the life of the operation. With respect to production operations, the unpredictable performance of a given reservoir often is associated with variations in fluid properties resulting from changes in the reservoir and/or changes in the fluid itself over time.

In a specific example, a well completion system comprises a flow control device for regulating fluid flow in a vertical wellbore or a deviated wellbore, e.g. a horizontal wellbore. The well completion system may be used in production operations and/or injection operations. In such applications, the flow rate tends to be higher with respect to highly permeable zones of the reservoir. The flow control device comprises at least one autonomously operated valve used in cooperation with a screen assembly of the well completion system. For example, the flow control device may be positioned beneath a filter media of the screen assembly at an end of the screen assembly. The autonomously operated valve is operable within a flow control device housing having a primary flow passage coupled with a corresponding base pipe port through a base pipe of the well completion system. For example, the flow control device may be placed in communication with an interior of the tubing/base pipe through one or more holes, e.g. nozzles, extending through a wall of the base pipe.

The valve of the flow control device and thus the operational position of the flow control device may be regulated via a control line having a flow regulation element, e.g. a Venturi-based flow regulation element. A differential pressure is developed via the flow regulation element, and the differential pressure depends on the type of fluid flowing through the flow control device. The Venturi element is based on the Bernoulli effect which gives a reduced pressure versus outlet pressure as the velocity of flow inside the Venturi element increases. This effect is strong when frictional effects are small, but decreases as frictional effects, e.g. frictional effects of high viscosity fluid, become more influential. The Venturi element also may have a diffuser and/or chamfered entry to help regain static pressure from the kinetic energy of flowing fluid. By making the Venturi element more or less optimal and/or adding frictional features to the Venturi element, the reduction in pressure loss can be adjusted. This also allows the shift in pressure response versus fluid properties to be tuned to the desired application. In the flow control device, a valve is actuated to a desired position based on the differential pressure established according to the type of fluid flowing through the flow control device and the Venturi element. Thus, the flow control device may be actuated autonomously to an improved position based on the fluid properties of the fluid flowing into the flow control device.

According to embodiments described herein, the flow control device comprises two types of flow lines: the main or primary flow passage and the secondary or control line passage. The main flow line can be either open or shut off by a piston movable in a corresponding piston chamber, thus controlling the primary production (or injection) flow through the flow control device. The secondary flow line is a control line which works with a flow regulation element to serve as the piston position controlling device by generating pressure differentials as a function of fluid properties, e.g. fluid viscosity, of the fluid flowing through the flow control device. With respect to the main flow of fluid along the main flow line, the flow control device may be used as a conventional inflow control device (ICD) before a change in flow conditions, e.g. a change in fluids, occurs. Accordingly, this main flow also may be determined, e.g. regulated, by selecting a desired size for a main flow opening to create a desired pressure drop such that the flow control device effectively serves as an ICD. For example, specific ICD nozzles may be selected to establish a desired flow through the main flow passage. The flow opening or flow area of the main flow passage can be tailored to provide different pressure drops based on, for example, optimizing reservoir depletion and production of well fluids. The main flow passage and the control flow passage/elements used to establish or regulate the main flow can be sized to provide specific pressure drops across the flow control device and the base pipe according to reservoir production parameters. Thus, the flow control device may be utilized as an ICD prior to a change in the flow conditions, e.g. prior to a change in the type of fluid flowing to the flow control device. When flow conditions change, however, the flow control device provides for autonomous adjustment as described in greater detail below.

In some embodiments, the secondary control flow line comprises a Venturi type flow regulation element which creates a desired pressure level at a throat of the Venturi which is the narrow section prior to the diffuser or discharge portion of the Venturi. For relatively high viscosity fluid, viscous (or frictional) losses in the discharge portion of the Venturi, i.e. past the throat, is higher than the Bernoulli type pressure drop at the throat. This pressure differential moves the piston, e.g. pushes the piston outwardly to open the main flow path. On the other hand, for fluids having relatively low fluid viscosity, the viscous losses at the discharge portion of the Venturi in the secondary flow line are lower. Hence, the dominating Bernoulli effect creates negative differential pressure at the region adjacent to the chamber in which the piston moves. This negative pressure effectively pulls the piston inwardly to block the main flow path. The point of the pressure differential sign change can be tuned using the geometrical dimensions of the secondary flow line discharge portion. Pressure losses at the discharge portion can be reduced and controlled by, for example, introducing a diffuser. It should be noted, however, the system may be used in an opposite manner in the sense that dense fluid with sufficient losses can be used to close the flow control device. A light (less dense) fluid can then be used to open the flow control device. This latter approach may be used in, for example, water versus gas applications.

Figure 1:
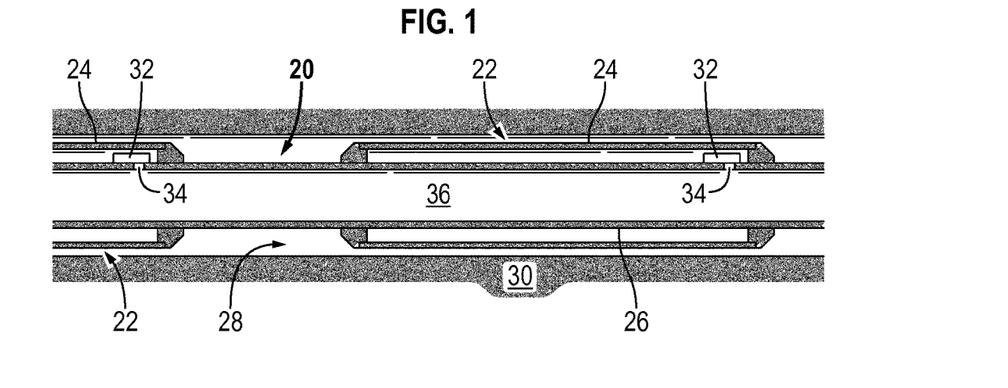
FIG. 1 is a schematic illustration of an example of a well system deployed in a wellbore and comprising at least one screen assembly in combination with a flow control device, according to an embodiment of the disclosure.

Referring generally to FIG. 1, an embodiment of a well completion system 20 is illustrated as comprising at least one and often a plurality of screen assemblies 22. The screen assemblies 22 individually comprise a filter media 24 disposed radially outward of a base pipe 26. For example, the filter media 24 may be in the form of a screen or mesh surrounding the base pipe 26. In this example, the well completion system 20 is disposed in a wellbore 28 of a well. The filter media 24 of each screen assembly 22 filters particulates from well fluid which flows into wellbore 28 from a surrounding formation and reservoir 30. In some applications, a gravel pack may be formed around the screen assemblies 22 to further filter particulates from the inflowing fluid. The well completion system 20 may be located in a deviated wellbore 28, e.g. a horizontal wellbore, located in the reservoir 30 for production of hydrocarbons fluids or other fluids.

As further illustrated in FIG. 1, a flow control device 32 is used in cooperation with the screen assembly 22. In some applications, at least one flow control device 32 may be used in cooperation with each of the screen assemblies 22 of the well completion system 20. By way of example, the flow control device 32 may be positioned radially inward of the filter media 24 of the corresponding screen assembly 22. Additionally, the flow control device 32 may be used to control flow of fluid through a base pipe port 34 (or a plurality of base pipe ports 34) extending through a wall of the base pipe 26. Depending on whether the well operation is a production operation or an injection operation, the flow control device 32 may be used to control fluid flow into an interior 36 of the base pipe 26 or fluid flow out of the base pipe 26 to the surrounding formation 30.

Figure 2:
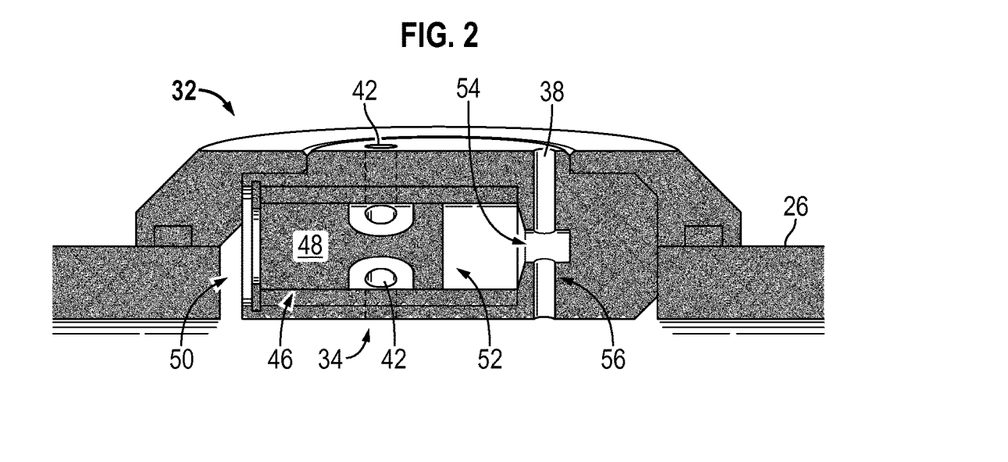
FIG. 2 is an illustration of an example of a flow control device operated autonomously based on establishing differential pressures associated with changes in fluid properties, according to an embodiment of the disclosure.
Figure 3:
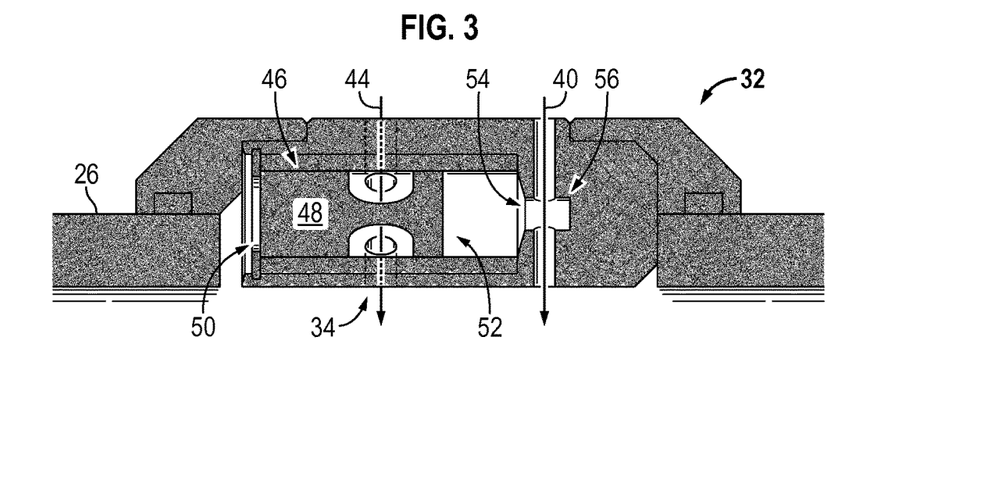
FIG. 3 is an illustration similar to that of FIG. 2 but providing arrows to show the flow paths along a primary flow passage and a control line passage, according to an embodiment of the disclosure.

Referring generally to FIG. 2, an example of the flow control device 32 is illustrated. The control device 32 may be mounted on base pipe 26 and placed downhole in wellbore 28. When the production of downhole well fluid begins, the pressure on the reservoir side of the flow control device 32 is higher than on the base pipe or tubing side of the flow control device. This pressure difference causes flow of well fluids from the reservoir 32 the interior 36 of base pipe 26. As illustrated, the flow control device 32 has two channels that connect the flow of fluid from the reservoir 30 to the interior 36. The two channels comprise a control line 38 (with control fluid flow represented by arrow 40 in FIG. 3) which remains open for flow and a primary flow passage 42 (with primary fluid flow represented by arrow 44 in FIG. 3). Flow through the primary flow passage 42 is controlled by a valve 46. By way of example, valve 46 may comprise a piston 48, although other types of valves, e.g. membranes, may be used to control flow along primary flow passage 42. As discussed above, the primary flow passage 42 may be sized to perform and function as an inflow control device during normal operations, e.g. operations prior to a change in the type of fluid flowing therethrough.

A first side 50 of the valve 46 is open to tubing pressure in base pipe 26 and a second side 52 of the valve 46 is open to pressure in control line 38 via a passage or port 54. A flow regulation element 56 is disposed along the control line 38 to establish different pressures in control line 38 according to the type of fluid flowing through the flow control device. If the control line pressure is higher than the tubing pressure, the valve 46, e.g. piston 48, moves to a position which opens (or closes) the flow of fluid through primary flow passage 42 of flow control device 32. If the control line pressure is lower than the tubing pressure, the valve 46 is shifted to another valve position which closes (or opens) the primary flow passage 42.

Figure 4:
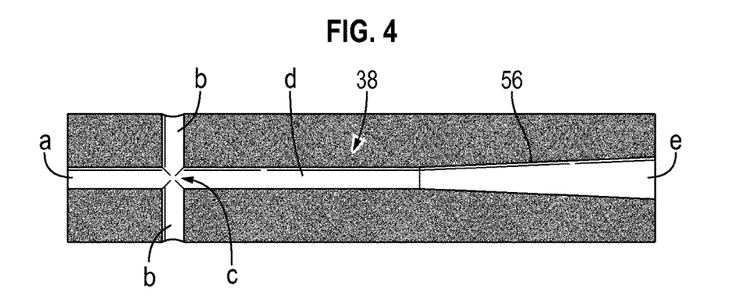
FIG. 4 is an illustration of a flow regulation element which may be employed along the control line passage, according to an embodiment of the disclosure.

With additional reference to FIG. 4, control line 38 is illustrated as remaining open to flow and including the flow regulation element 56. In the example illustrated, the flow regulation element 56 comprises flow elements including an entry a, one or more communication channels b, a control pressure port c, an optional straight flow section d, and a diffuser e. The illustrated example of flow regulation element 56 is a Venturi type flow regulation element having a shape and function similar to a Venturi Tube. The flow elements are constructed so that a fluid entering the control line 38 accelerates at the entry a and achieves a relatively high velocity and therefore a low dynamic pressure. The diffuser e allows the flowing fluid to regain the pressure without high energy loss when exiting the control line 38. The control pressure created by the regulation element 56 is connected to valve 46/piston 48 via flow elements c and b (see also FIGS. 5 and 6).

The flow elements a, b, c, d, and/or e are constructed so that the dynamic pressure at control pressure port c is below both an annulus or reservoir pressure of reservoir 30 and a tubing static pressure at the interior 36 of the tubing/base pipe 26 for a type of downhole fluids. For another type of downhole fluids having a lower viscosity, the energy losses through friction in, for example, straight flow section d and diffuser e are higher such that the dynamic pressure at control pressure port c is above the tubing static pressure at interior 36, e.g. between the tubing static pressure and the annulus or reservoir pressure. The illustrated embodiment utilizes control pressure in tube d as a viscosity dependent restriction (e.g. around 10-50 mm tube, but also can be porous media) which is in front of diffuser e. The Venturi element 56 creates the local control pressure below both the reservoir pressure of reservoir 30 and the tubing pressure within base pipe 26 for a specific flow condition, e.g. a specific fluid type.

The flow control device 32 can autonomously open and close, multiple times, depending on the fluid flowing through the device. If a desirable fluid/flow condition is present, e.g. oil flow, the pressures on the valve 46 will be such that it will be constantly pushed into the open position. This will cause high production from this zone through the open valve. If an undesired fluid appears, e.g. water, it will flow through control line 38 and change the pressure on one side of the piston 48 (due to the construction of flow regulation element 56) pushing the piston 48 into a closed position. This will restrict the flow through the flow control device 32. Flow will remain open in the control line 38 for each type of fluid. It should be noted that the configuration of the regulation element 56 may be adjusted according to the types of fluid anticipated in a given wellbore environment or other type of environment. For example, the length of tube section d, the length and angle of diffuser e, the size and angle/chamfer of inlet a, and/or other features of the flow regulation element 56 may be tailored according to the characteristics of fluids and potential fluids passing through flow control device 32. In the various embodiments described herein, the flow regulation element 56 may be in the form of the Venturi type element illustrated in FIG. 4, and the various individual flow elements may be constructed according to the parameters of the application in which the flow control device is utilized.

Figure 5:
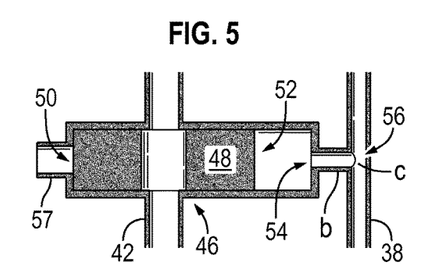
FIG. 5 is an illustration of another example of a flow control device, according to an embodiment of the disclosure.
Figure 6:
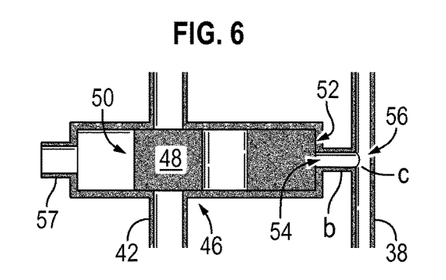
FIG. 6 is an illustration of another example of a flow control device, according to an embodiment of the disclosure.

Simplified versions of the flow control device 32 are illustrated in FIGS. 5 and 6 to facilitate an understanding of the various embodiments of the flow control devices 32 described herein. In FIG. 5, for example, piston 48 of the valve 46 is exposed to tubing pressure within base pipe 26 via port 57 on one side and to a control pressure at control pressure port c of the regulation element 56 on an opposite side of the piston 48. The pressures acting on the piston 48 of valve 46 maintain the valve 46 in an open flow position with respect to fluid flow through the primary flow passage when a specific type of fluid flows through flow regulation element 56. Upon the presence of a different well fluid, however, a different flow condition is created and the control pressure established by flow regulation element 56 in the control line 38 (and thus the differential pressure acting on the valve) changes, thus causing the piston 48 of valve 46 to shift to a closed position, as illustrated in FIG. 6. As illustrated in these examples and in other embodiments described herein, both the primary flow passage 42 and the control line passage 38 extend between interior 36 of base pipe 26 and the surrounding annulus exposed to the pressure of reservoir 30, thus establishing independent flow passages through the flow control device 32.

Figure 7:
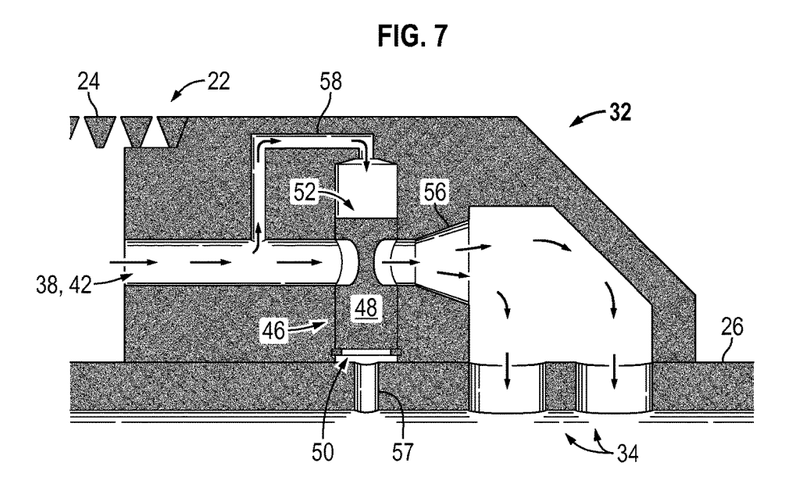
FIG. 7 is an illustration of another example of a flow control device, according to an embodiment of the disclosure.

Referring generally to FIG. 7, another embodiment of the flow control device 32 is illustrated. In this example, the control line and the primary flow passage are unified such that high velocity and potentially reduced pressure is achieved in this flow channel. This reduced pressure is detected through the connection line 58 which is in communication with one side of the piston valve 48 while the other side of the piston valve 48 is in communication with the interior of base pipe 26. In this type of embodiment, the control line is much larger and behaves as a main production line as well. The control pressure is used to open or close (or restrict) the main production line, e.g. primary flow passage, as well as the control line via the flow regulation element 56 which may be in the form of a diffuser, as illustrated. In some applications, the flow regulation element 56 may comprise a chamfered entry. It should be noted that in some embodiments the flow regulation element 56 may utilize a diffuser combined with a chamfered entry to help regain static pressure from the kinetic energy of the flowing fluid. Again, the shape of flow regulation element 56 and its various individual flow elements may be tailored to, for example, maximize the discharge from control line 38 and the Venturi effect.

Figure 8:
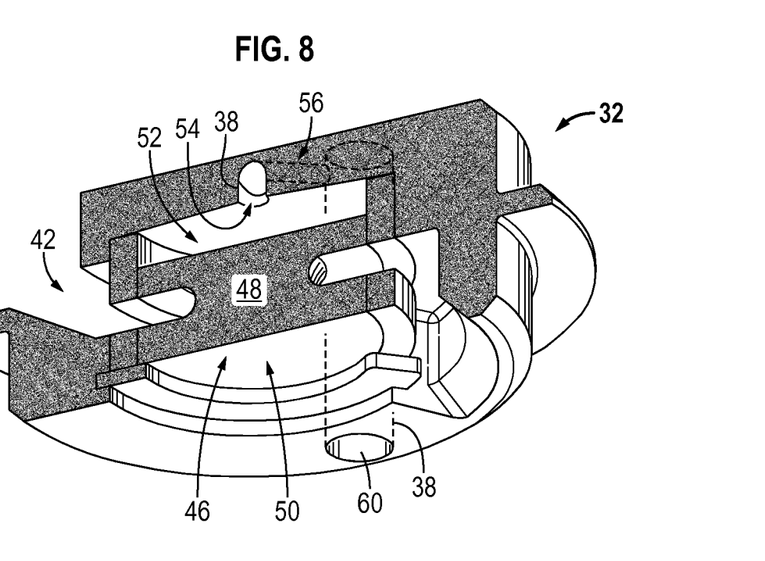
FIG. 8 is an illustration of another example of a flow control device, according to an embodiment of the disclosure.
Figure 9:
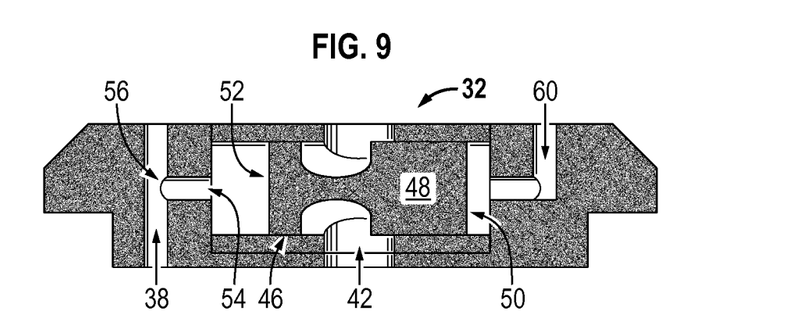
FIG. 9 illustrates another example of a flow control device, according to embodiments of the disclosure.
Figure 10:
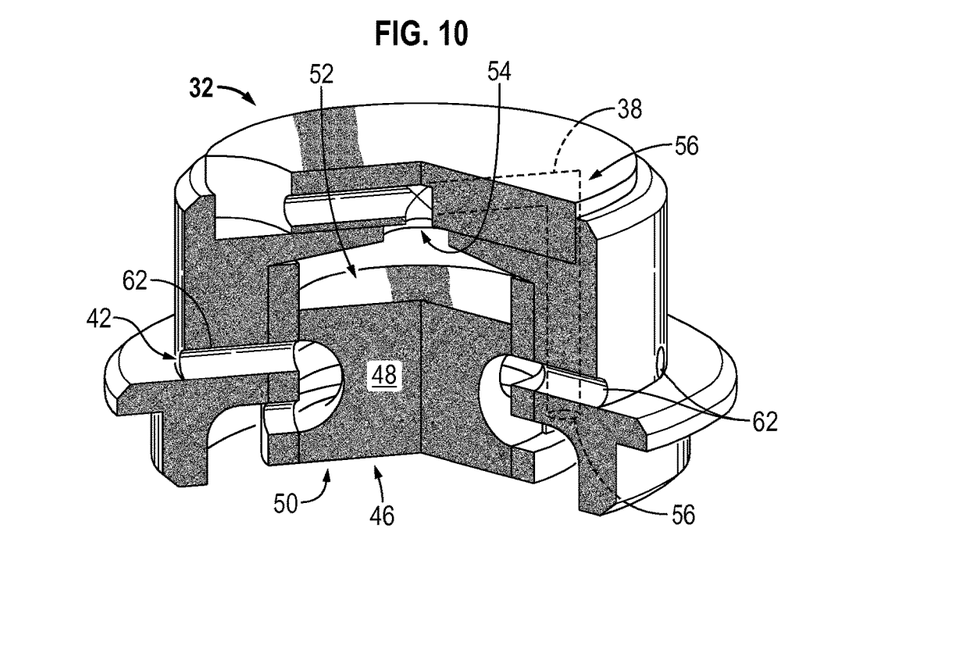
FIG. 10 is an illustration of another example of a flow control device, according to an embodiment of the disclosure.

It should be noted, however, that the construction and arrangement of the valve, piston (or other valve element), primary flow passage, and control line may vary for different embodiments of flow control device 32, as illustrated by the embodiments in FIGS. 8-10. Additionally, many embodiments of flow control device 32 may be employed in injection operations. Some embodiments may be modified to facilitate injection operations. In FIG. 9, for example, the flow control device 32 is constructed with control line passage 38 and primary flow passage 42 such that the flow control device 32 is readily used in various injection operations. In this example, one side of the piston 48 of valve 46 is exposed to the annulus pressure rather than the tubing pressure because in an injection scenario the tubing pressure is higher than the annulus pressure.

Referring generally to FIG. 10, another embodiment of flow control device 32 is illustrated. The embodiment of FIG. 10 is similar to the embodiment illustrated in FIG. 8 except the primary flow passage 42 is configured differently. Instead of fluid entering valve 46 along an opening arranged in an arc or ring as illustrated in FIG. 8, the fluid flows into valve 46 through a plurality of inlet ports 62 arranged along a valve housing.

Figure 11:
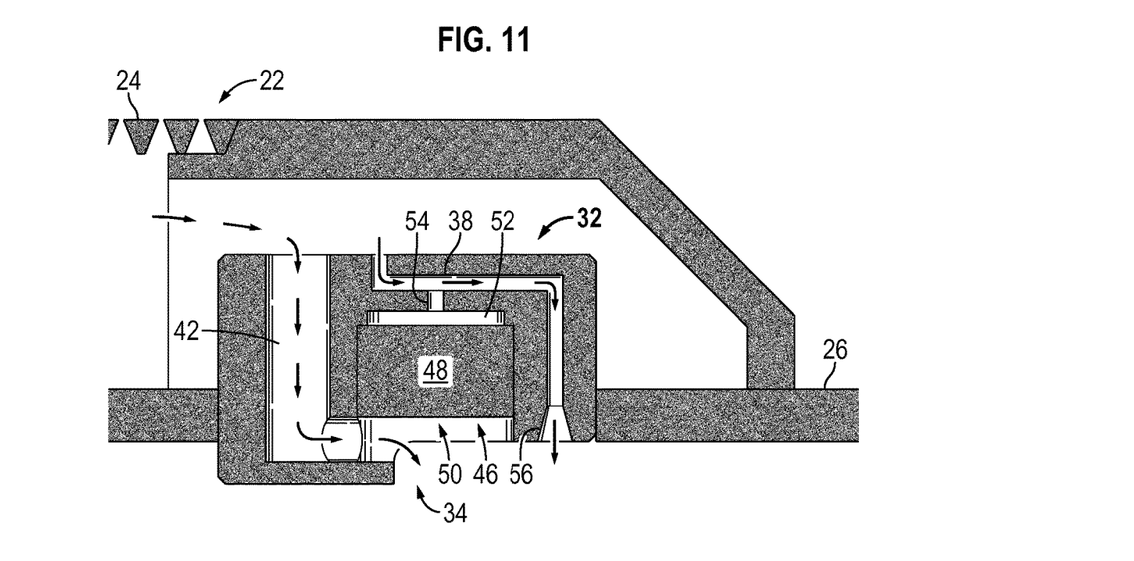
FIG. 11 is an illustration of another example of a flow control device, according to an embodiment of the disclosure.

Referring generally to FIG. 11, another embodiment of flow control device 32 is illustrated as positioned along base pipe 26. In this example, another embodiment of the control line 38 is illustrated as combined with flow regulation element 56 to create pressure differentials acting on piston 48 according to the types of fluid flowing through the primary flow passage 42 and the control line 38. In this type of configuration and certain other embodiments, the system may be used in an opposite manner in the sense that dense fluid with sufficient pressure losses can be used to close the flow control device 32. A light (less dense) fluid can then be used to open the flow control device 32. This latter approach may be used in, for example, water versus gas applications.

Figure 12:
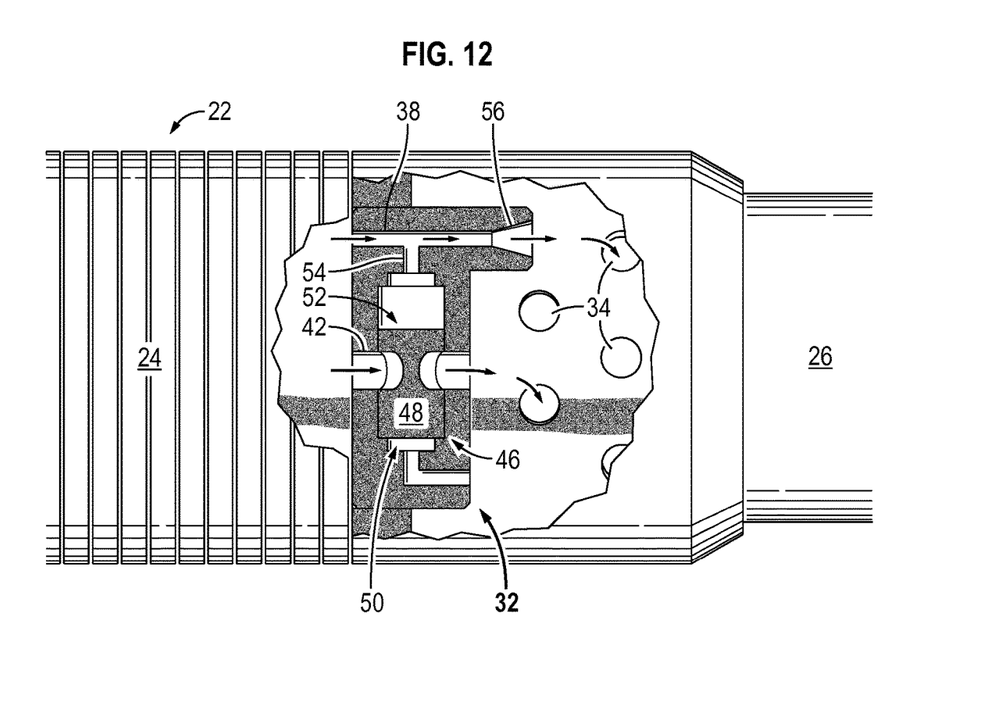
FIG. 12 is an illustration of another example of a flow control device, according to an embodiment of the disclosure.
Figure 13:
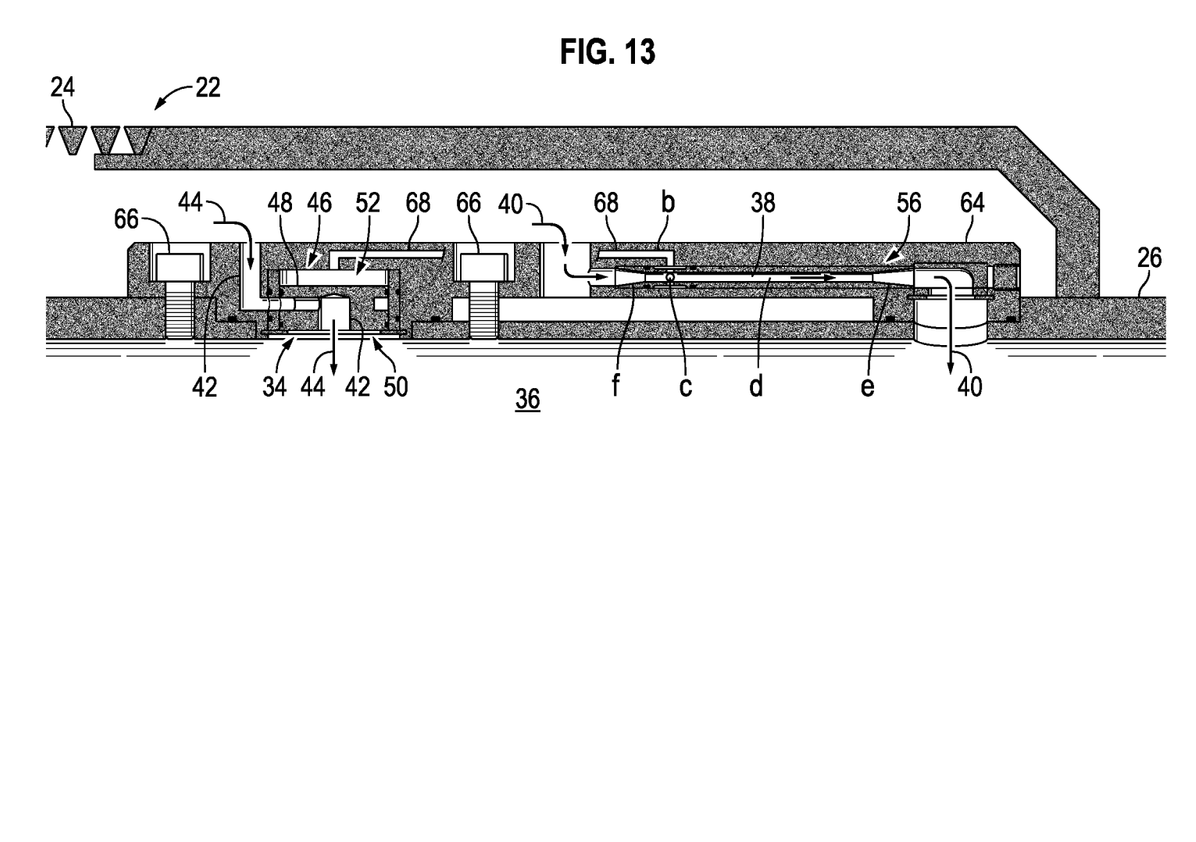
FIG. 13 is an illustration of another example of a flow control device, according to an embodiment of the disclosure.

FIG. 12 illustrates another arrangement of valve 46 with primary flow passage 42, control line 38, and flow regulation element 56 positioned along control line 38. In this latter example, the flow control device 32 is again positioned in a screen assembly 22. In FIG. 13, a similar embodiment is illustrated in which the flow control device 32 comprises a suitable housing 64 mounted along the base pipe 26. The housing 64 may be coupled to the base pipe 26 via suitable fasteners 66, e.g. threaded bolts. As illustrated and as described in conjunction with other embodiments, the flow regulation device 56 may be in the form of a Venturi having a diffuser e which is in fluid communication with control line 38. The control line 38 also is in fluid communication with piston 48 of valve 46 via a control line portion 68. Flow along the primary flow passage 42 is controlled by piston 48 of valve 46, as with the embodiment illustrated in FIG. 12 and other embodiments described above. In some embodiments such as the embodiment illustrated in FIG. 13, the flow control device 32 may have several entry ports providing the main flow passage 42 to valve 46. Each of these entry ports may have an insert which can be changed/selected to establish a desired internal diameter and thus to increase or lower the differential pressure acting on the flow control device 32. Thus, the size of the entry ports may be adjusted to establish a desired main flow so the flow control device 32 may function as an inflow control device with a desired pressure drop for optimizing or otherwise establishing a desired reservoir production.

In the embodiment of FIG. 13 and other embodiments described above, the valve 46 of the flow control device 32 and thus the operational position of the flow control device 32 may be regulated via the control line 38 combined with flow regulation element 56, e.g. a Venturi-based flow regulation element. A differential pressure is developed via the flow regulation element 56, and the differential pressure depends on the type of fluid flowing through the flow control device 32. The Venturi element 56 may have a diffuser, e.g. diffuser e, and a chamfered entry f to help regain static pressure from the kinetic energy of flowing fluid. By making the Venturi element more or less optimal and/or adding frictional features to the Venturi element, the reduction in pressure loss can be adjusted. This also allows the shift in pressure response versus fluid properties to be tuned to the desired application. Within the flow control device 32, the valve 46 may be actuated to a desired position based on the differential pressure established according to a specific flow condition, e.g. according to the type of fluid flowing through the flow control device 32 and the Venturi element 56. Thus, the flow control device 32 may be actuated autonomously to an improved position based on the fluid properties of the fluid flowing into the flow control device 32.

As with other embodiments described above, the embodiment of FIG. 13 utilizes flow control device 32 with two distinct flow paths. The primary flow path 44 is defined by primary flow passage 42 and extends between interior 36 and the annulus surrounding the flow control device 32 within the wellbore 28. The secondary or control flow path 40, defined by control line 38 and flow regulation element 56, similarly extends between interior 36 and the annulus rounding the flow control device 32. The primary flow passage 42 may be used for production flow (or in some cases injection flow) and the control flow path 40 is used to establish a control pressure at flow regulation element 56. As described above with respect to the other embodiments, the flow regulation element 56 illustrated in FIG. 13 is constructed so that the dynamic pressure at control pressure port c is below an annulus/reservoir pressure of reservoir 30 and below a tubing static pressure at the interior 36 of the tubing/base pipe 26 for a specific type or types of downhole fluid. For another type of downhole fluid having a lower viscosity, the energy losses through friction in, for example, straight flow section d and diffuser e are higher such that the dynamic pressure at control pressure port c is above the tubing static pressure at interior 36, e.g. between the tubing static pressure and the annulus/reservoir pressure. This change in dynamic pressure resulting from a change fluid type causes an autonomous shifting of piston 48 to move valve 46 to a different operational position, e.g. a position blocking flow along primary flow passage 42.

In various types of applications, the flow control device 32 provides a valve which remains open for desired fluids and which automatically closes for undesired fluids. For these types of applications, the flow control device 32 is constructed to create a pressure below tubing pressure and annular pressure for a given type of fluid or fluids but not for another fluid or fluids. This autonomous adjustment capability may be driven by the Reynolds number which is a function of fluid viscosity, fluid density, fluid velocity, and flow passage diameter. In many cases, the flow control device 32 is constructed to autonomously adjust as a result of a change in fluid properties, e.g. a change in viscosity and/or density, but the flow control device 32 also can be tuned to react to changes in fluid velocity as result of changes in differential pressure. Thus, the flow control device 32 may be constructed to react to various changes in type of fluid flowing through the device and/or to other changes in flow conditions.

Depending on the application, the flow regulation element 56 may be constructed in various forms to achieve a desired result. For example, the shape of the regulation element 56 may be controlled, e.g. the angles of the diffuser and inlet may be selected according to a desired pressure drop or other control function. The shape of the flow regulation element 56 and its dimensions may be chosen according to a desired performance and to provide improved effects with respect to the routing of fluids through control line passage 38. In many applications, the dimensions and shape of the flow regulation element 56 may be arranged to establish a Venturi and to optimize a desired Venturi effect.

Accordingly, embodiments described herein may be used to provide autonomous restriction of fluid flow through a passage connecting the reservoir and the production tubing, thus reducing the production of unwanted fluids from that section. Various embodiments of the flow control device may comprise a valve controlling flow through a major conduit between the reservoir and the tubing and through a control line. The valve is opened or closed using the pressure level established by the control line and the tubing pressure. The control line remains open and provides a small channel connecting the reservoir and the production tubing. A flow regulation element may be effectively created via control line diameter and length which are designed in advance to differentiate between two given fluids present in the reservoir, while one is wanted, and the second one is unwanted.

Depending on the application, many types of flow control devices may be employed in the overall system. For example, the flow control devices may be constructed as inflow control devices for controlling the inflow of production fluid and/or other well fluid. However, the flow control devices also may be constructed to accommodate outflow of fluid during, for example, fluid injection operations. Additionally, the individual flow control devices may have various types of housings, passages, pistons, and flow regulation elements arranged to regulate flow based on differential pressures established as a result of the different fluid properties of fluid flowing through the individual flow control devices. Various materials may be used in constructing the flow control device housing, piston, and/or other features and elements of the flow control devices.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for controlling flow, comprising:
a completion system deployed in a wellbore drilled into a reservoir, the wellbore being exposed to a reservoir pressure, the completion system comprising a tubing, having a tubing pressure therein, and an autonomous flow control device to regulate fluid flow through a port, the autonomous flow control device comprising:
a primary flow passage in communication with the port;
a single control line passage;
a valve exposed to the single control line passage and to tubing pressure, the valve controlling flow through the primary flow passage; and
a flow regulation element disposed in the single control line passage, the flow regulation element being configured to establish a control pressure lower than both the reservoir pressure and the tubing pressure under certain flow conditions, the flow regulation element further establishing a differential pressure as a function of fluid properties of a fluid flowing through the single control line passage, the differential pressure being used to actuate the valve to regulate the fluid flow through the port.

2. The system as recited in claim 1, wherein the flow regulation element comprises a Venturi element.

3. The system as recited in claim 1, wherein the tubing comprise a base pipe and wherein the completion system comprises at least one screen assembly having the base pipe and a filter media positioned radially outward of the base pipe, the primary flow passage being in communication with the port which is disposed through a wall of the base pipe.

4. The system as recited in claim 3, wherein the flow control device is positioned between the filter media and the base pipe.

5. The system as recited in claim 1, wherein the valve comprises a piston shifted by the differential pressure to control flow through the primary flow passage.

6. A system for controlling flow, comprising:
a sand control system having a screen assembly, the screen assembly comprising:
a tubing and a flow control device mounted to the tubing, the flow control device having a valve positioned in a housing for movement between flow positions, the valve being positioned along a primary flow passage extending between an exterior of the flow control device and an interior of the tubing, the movement between flow positions being controlled by a flow regulation element disposed along a single control line also extending between the exterior of the flow control device and the interior of the tubing;
the flow regulation element being constructed to establish a control pressure below both pressure external to the flow control device and pressure within the tubing during a specific flow condition, the flow regulation element further being configured to establish different differential pressures based on properties of fluids flowing through the flow regulation element to autonomously actuate the flow control device to a desired flow position.

7. The system as recited in claim 6, wherein the flow regulation element comprises a diffuser.

8. The system as recited in claim 6, wherein the flow regulation element comprises a Venturi element.

9. The system as recited in claim 6, wherein the flow regulation element comprises a chamfered inlet.

10. The system as recited in claim 6, wherein the tubing comprises a base pipe having at least one opening through which fluid enters the base pipe via the flow control device.

11. The system as recited in claim 7, wherein the screen assembly comprises a filter media positioned radially outward of the base pipe, the primary flow passage being in communication with a port which is disposed through a wall of the base pipe.

12. The system as recited in claim 11, wherein the flow control device is positioned between the filter media and the base pipe.

13. The system as recited in claim 12, wherein the valve comprises a piston shifted by the differential pressure to control flow through the primary flow passage.

14. The system as recited in claim 6, wherein differential pressure acting on the valve changes upon the presence of another well fluid having a sufficiently different viscosity.

15. The system as recited in claim 6, wherein differential pressure acting on the valve shifts the valve between open and closed positions based on changes in the type of well fluid flowing through the flow control device.

16. A method for controlling flow, comprising:
positioning an autonomous flow control device at a port of a base pipe;
routing both a primary flow passage and a single control flow passage through the flow control device from an exterior of the flow control device to an interior of the base pipe;
using a valve disposed along the primary flow passage within the flow control device to regulate the amount of fluid flow through the port;
autonomously operating the valve via a flow regulation element disposed along the single control flow passage, the flow regulation element establishing a differential pressure on the valve based on properties of a fluid flowing through the control flow passage of the flow control device, thus actuating the flow control device to a desired flow position; and
forming the flow regulation element to establish a local control pressure below both reservoir pressure external to the flow control device and tubing pressure within the base pipe under certain flow conditions.

17. The method as recited in claim 16, further comprising forming the flow regulation element with a Venturi.

18. The method as recited in claim 16, further comprising forming the flow regulation element with a chamfered entry and a diffuser to create a reduced local pressure.

19. The method as recited in claim 16, wherein positioning comprises positioning the flow control device in a screen assembly deployed in a wellbore drilled into a reservoir.

* * * * *